US010340776B2

(12) United States Patent
Lee et al.

(10) Patent No.: US 10,340,776 B2
(45) Date of Patent: Jul. 2, 2019

(54) ACCELERATION METHOD FOR V/F CONTROLLED INDUCTION MOTOR IN FLUX-WEAKENING REGION

(71) Applicants: Eaton Corporation, Cleveland, OH (US); Zhejiang University, Hangzhou (CN)

(72) Inventors: Kevin Lee, Menomonee Falls, WI (US); Kai Wang, Hang Zhou (CN); Wenxi Yao, Hangzhou (CN)

(73) Assignees: Eaton Intelligent Power Limited, Dublin (IE); Zhejiang University, Zhejiang (CN)

( * ) Notice: Subject to any disclaimer, the term of this patent is extended or adjusted under 35 U.S.C. 154(b) by 90 days.

(21) Appl. No.: 15/506,785

(22) PCT Filed: Aug. 25, 2015

(86) PCT No.: PCT/CN2015/088024
§ 371 (c)(1),
(2) Date: Feb. 27, 2017

(87) PCT Pub. No.: WO2016/029840
PCT Pub. Date: Mar. 3, 2016

(65) Prior Publication Data
US 2017/0257041 A1 Sep. 7, 2017

(30) Foreign Application Priority Data
Aug. 29, 2014 (CN) .......................... 2014 1 0437801

(51) Int. Cl.
*H02P 1/16* (2006.01)
*H02P 1/28* (2006.01)
(Continued)

(52) U.S. Cl.
CPC ............... *H02K 17/02* (2013.01); *H02P 1/28* (2013.01); *H02P 1/30* (2013.01); *H02P 23/0031* (2013.01);
(Continued)

(58) Field of Classification Search
CPC .... H02P 1/16; H02P 9/10; H02P 21/02; H02P 23/02; H02P 29/024; H02P 27/047; H02K 17/02
See application file for complete search history.

(56) References Cited

U.S. PATENT DOCUMENTS 5,612,605 A * 3/1997 Tao .......................... H02P 27/08
318/400.17
7,039,542 B2 * 5/2006 Fujii .................... G01R 31/343
318/727
(Continued)

FOREIGN PATENT DOCUMENTS

CN 102098000 A 6/2011
CN 103701393 A 4/2014
(Continued)

OTHER PUBLICATIONS

Kim et al., "Maximum Torque Control of an Induction Machine in the Field Weakening Region," IEEE Industry Applications Society Annual Meeting Conference Record, Oct. 2-8, 1993, pp. 401-407.
(Continued)

*Primary Examiner* — Eduardo Colon Santana
*Assistant Examiner* — Said Bouziane
(74) *Attorney, Agent, or Firm* — Ziolkowski Patent Solutions Group, SC

(57) ABSTRACT

The present invention provides an acceleration method for V/f controlled induction motor in flux-weakening region, which comprises: acquiring no-load magnetizing current $I_m$ of the induction motor at current stator frequency; selecting
(Continued)

a smaller one of $0.5 \cdot I_m(1/\sigma+1)$ and $(I_m^2+\sigma)/(I_m+\sigma I_m)$ as magnetizing current set point, in which σ is an estimated total leakage inductance coefficient; getting an error signal by subtracting the magnetizing current of the induction motor from the magnetizing current set point; determining the stator frequency for the next control period according to the error signal which is provided as a controlling variable of negative feedback. The acceleration method of the present invention can provide the maximum output torque in flux-weakening region and has a larger tolerance for the error of the estimated leakage inductance.

15 Claims, 3 Drawing Sheets

(51) Int. Cl.
*H02P 1/30* (2006.01)
*H02P 1/38* (2006.01)
*H02K 17/02* (2006.01)
*H02P 23/00* (2016.01)
*H02P 27/04* (2016.01)
*H02P 103/10* (2016.01)

(52) U.S. Cl.
CPC ........ *H02P 27/047* (2013.01); *H02P 2103/10* (2015.01)

(56) References Cited

U.S. PATENT DOCUMENTS

| | | | |
|---|---|---|---|
| 7,956,637 B2 * | 6/2011 | Lu | H02P 23/14 324/765.01 |
| 2012/0098472 A1 * | 4/2012 | Wrobel | H02P 1/28 318/400.11 |

FOREIGN PATENT DOCUMENTS

| | | |
|---|---|---|
| CN | 103840732 A | 6/2014 |
| JP | 2014150644 A | 8/2014 |

OTHER PUBLICATIONS

Seok et al., "Optimal Flux Selection of an Induction Machine for Maximum Torque Operation in Flux-Weakening Region," IEEE Transactions on Power Electronics, vol. 14, No. 4, Jul. 1999, pp. 700-708.
Xu et al., "Stator Flux Orientation Control of Induction Machines in the Field Weakening Region," IEEE Industry Applications Society Annual Meeting Conference Record, 1988, pp. 437-443.
Hai-Yan et al., "Field-weakening control of induction motor for electric vehicles," Abstract, pp. 1-2, http://en.cnki.com.cn/Article_en/CJFDTOTAL-DJKZ200505011.htm.
Harnefors et al., "Torque-Maximizing Field-Weakening Control: Design, Analysis, and Parameter Selection," IEEE Transactions on Industrial Electronics, vol. 48, No. 1, Feb. 2001, pp. 161-168.
Harnefors et al., "Optimum-Seeking Field Weakening Control of Induction Motor Drives," IEEE Power Electronics and Variable Speed Drives, Conference Publication No. 475, Sep. 18-19, 2000, pp. 176-181.
Shin et al., "Maximum Torque Control of Stator Flux-Oriented Induction Machine Drive in the Field Weakening Region," IEEE Industry Applications Conference Record, 2000, pp. 1461-1467.
Xu et al., "Selection of the Flux Reference for Induction Machine Drives in the Field Weakening Region," IEEE Transactions on Industry Applications, vol. 28, No. 6, Nov./Dec. 1992, pp. 1353-1358.
Casadei et al., "A Robust Method for Field Weakening Operation of Induction Motor Drives with Maximum Torque Capability," IEEE Industry Applications Conference Record, 41st IAS Annual Meeting, 2006, pp. 111-117.
Nisha et al., "Effect of Leakage Inductance on Torque Capability of Field Oriented Controlled Induction Machine in Field Weakening Region," International Conference on Advances in Engineering and Technology (ICAET'2014), Mar. 29-30, 2014, Singapore, pp. 549-556.

* cited by examiner

ACCELERATION METHOD FOR V/F CONTROLLED INDUCTION MOTOR IN FLUX-WEAKENING REGION

FIELD OF THE INVENTION

The present invention relates to an acceleration controlling method for induction motor, and particularly, to an acceleration method for V/f controlled induction motor in flux-weakening region.

BACKGROUND OF THE INVENTION

At present, AC speed regulating system with flux-weakening control strategy and high speed control performance has been widely used in the fields of spindle drive of numerical control machine tools and electric vehicles.

After the motor speed exceeds the base speed, since the output voltage of inverter reaches its maximum value, it is usually to reduce the magnetic flux in the induction motor, i.e. to reduce the back electromotive force by using flux-weakening controlling method, so as to meet required back electromotive force of rotor for increasing the motor speed. The traditional flux-weakening controlling method is to make the excitation of the rotor inversely proportional to the speed. However, the above controlling method can't provide the maximum output torque, seriously affecting the motor performance.

In the flux-weakening region of V/f controlled induction motor, a smaller stator frequency acceleration value cannot provide sufficient torque for speeding up the motor, so that the acceleration process of the rotor of the motor becomes longer. However, a larger stator frequency acceleration value can lead to overcurrent shutdown and system collapse. In addition, the leakage inductance parameter has a significant impact on the system stability when the motor speed exceeds the base speed. If the leakage inductance parameter is underestimated, there will be no stable operation point in the induction motor.

SUMMARY OF THE INVENTION

In order to solve the above-mentioned problems, an embodiment of the present invention provides an acceleration method for V/f controlled induction motor in flux-weakening region, which comprises the following steps:

1) acquiring no-load magnetizing current $I_m$ of the induction motor at current stator frequency;

2) selecting a smaller one of $0.5 \cdot I_m(1/\sigma+1)$ and $(I_m^2+\sigma)/(I_m+\sigma I_m)$ as magnetizing current set point, in which $\sigma$ is an estimated total leakage inductance coefficient;

3) getting an error signal by subtracting the magnetizing current of the induction motor from the magnetizing current set point; and 4) determining the stator frequency for the next control period according to the error signal which is provided as a controlling variable of negative feedback.

Preferably, in the step 4), getting a stator frequency acceleration value which is provided as a controlled variable according to the error signal which is provided as a controlling variable of negative feedback, and determining the stator frequency for the next control period according to the stator frequency acceleration value.

Preferably, in the step 4), setting the stator frequency for the next control period as a predetermined stator frequency when the determined stator frequency for the next control period is greater than the predetermined stator frequency.

Preferably, the negative feedback controller is a proportional integral controller, in the step 4), the stator frequency acceleration value is equal to the error signal multiplied by $K_p+K_i/s$, where $K_p$ is a proportional adjustment coefficient, $K_i$ is an integral adjustment coefficient, and s represents the frequency domain.

Preferably, the negative feedback controller is a proportional integral controller, in the step 4), the stator frequency acceleration value is equal to the error signal multiplied by $(K_p+K_i/s)/\omega_e(n)$, where $K_p$ is a proportional adjustment coefficient, $K_i$ is an integral adjustment coefficient, s represents a frequency domain, and $\omega_e(n)$ is a per unit value of the current stator frequency.

Preferably, in the step 1), getting the no-load magnetizing current by dividing a rated no-load magnetizing current of the induction motor by the per unit value of the current stator frequency.

Preferably, in the step 2), estimating the total leakage inductance coefficient according to an off-line parameter identification method of the induction motor.

An embodiment of the present invention provides a V/f controlling method, which comprises the above-mentioned acceleration method for V/f controlled induction motor in flux-weakening region.

An embodiment of the present invention provides an acceleration system for V/f controlled induction motor in flux-weakening region, which comprises:

a no-load magnetizing current acquiring device for acquiring no-load magnetizing current $I_m$ of the induction motor at current stator frequency;

a magnetizing current setting device for selecting a smaller one of $0.5 \cdot I_m(1/\sigma+1)$ and $(I_m^2+\sigma)/(I_m+\sigma I_m)$ as magnetizing current set point, in which $\sigma$ is an estimated total leakage inductance coefficient;

an error signal calculating device for getting an error signal by subtracting the magnetizing current of the induction motor from the magnetizing current set point; and a stator frequency determining device for determining the stator frequency for the next control period according to the error signal which is provided as a controlling variable of negative feedback.

Preferably, the stator frequency determining device comprises:

a negative feedback controller for getting a stator frequency acceleration value which is provided as a controlled variable according to the error signal which is provided as a controlling variable of negative feedback, and a stator frequency calculating device for determining the stator frequency for the next control period according to the stator frequency acceleration value.

Preferably, the stator frequency determining device further comprises a stator frequency limiting device for setting the stator frequency for the next control period as a predetermined stator frequency when the determined stator frequency for the next control period is greater than the predetermined stator frequency.

Preferably, the negative feedback controller is a proportional integral controller, the stator frequency acceleration value is equal to the error signal multiplied by $K_p+K_i/s$, where $K_p$ is a proportional adjustment coefficient, $K_i$ is an integral adjustment coefficient, and s represents the frequency domain.

Preferably, the negative feedback controller is a proportional integral controller, the stator frequency acceleration value is equal to the error signal multiplied by $(K_p+K_i/s)/\omega_e(n)$, where $K_p$ is a proportional adjustment coefficient, $K_i$ is an integral adjustment coefficient, s represents a frequency domain, and $\omega_e(n)$ is a per unit value of the current stator frequency.

Preferably, the no-load magnetizing current acquiring device is configured to get the no-load magnetizing current by dividing a rated no-load magnetizing current of the induction motor by the per unit value of the current stator frequency.

Preferably, the magnetizing current setting device is further configured to estimate the total leakage inductance coefficient according to an off-line parameter identification method of the induction motor.

An embodiment of the present invention provides a V/f controlling system, which comprises the above-mentioned acceleration system for V/f controlled induction motor in flux-weakening region.

The acceleration method of the present invention can provide the maximum output torque in flux-weakening region, has a fast acceleration under the condition of insuring the stability of the system, and has a larger tolerance for the error of the estimated leakage inductance coefficient.

BRIEF DESCRIPTION OF THE DRAWINGS

Below, embodiments of the present invention are described in more detail with reference to the attached drawings, wherein.

DETAILED DESCRIPTION OF THE INVENTION

Figure 1:
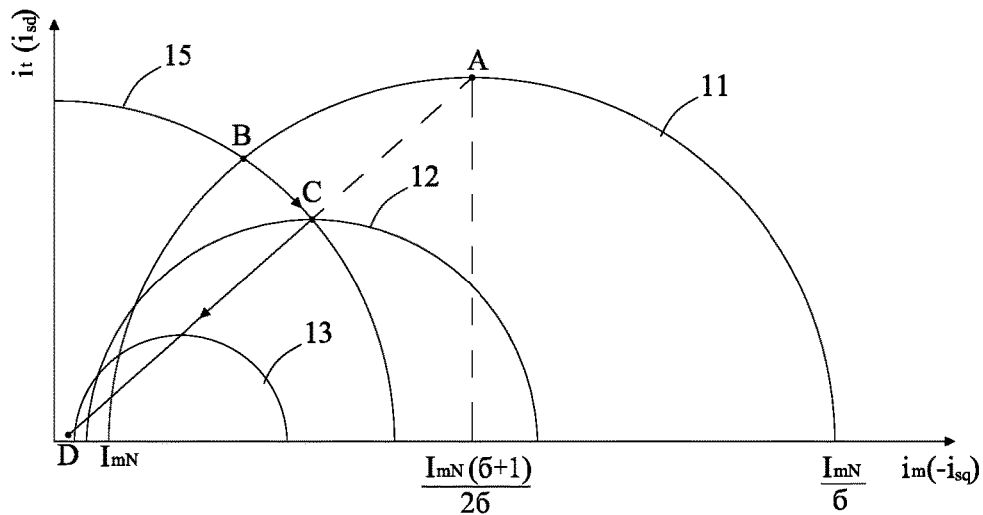
FIG. 1 is functional images of magnetizing current and torque current for satisfying the system stability and maximum current limiting in Cartesian coordinate system.

In order to make the objects, technical solution and advantages of the present invention clearer, the present invention is further illustrated in detail by the specific embodiments below, with reference to the drawings. It should be understood that the specific embodiments described herein are used to explain the present invention and are not intended to limit the present invention.

The basic dynamic model of induction motor in d-q coordinates are represented by equations (1) and (2) as follows:

$$\begin{cases} \psi_{sd} = L_s i_{sd} + L_m i_{rd} & \psi_{rd} = L_m i_{sd} + L_r i_{rd} \\ \psi_{sq} = L_s i_{sq} + L_m i_{rq} & \psi_{rq} = L_m i_{sq} + L_r i_{rq} \end{cases} \quad (1)$$

$$\begin{cases} p\psi_{sd} = -R_s i_{sd} + \omega_e \psi_{sq} + u_{sd} & p\psi_{rd} = -R_r i_{rd} + \omega_s \psi_{rq} \\ p\psi_{sq} = -R_s i_{sq} - \omega_e \psi_{sd} + u_{sq} & p\psi_{rq} = -R_r i_{rq} - \omega_s \psi_{rd} \end{cases} \quad (2)$$

Where p is the differential operator, $\psi_{sd}$ is the d-axis component of the stator flux linkage, $\psi_{rd}$ is the d-axis component of the rotor flux linkage, $\psi_{sq}$ is q-axis component of the stator flux linkage, $\psi_{rq}$ is q-axis component of the rotor flux linkage, $L_m$, $L_s$ and $L_r$ are the excitation inductance, the stator inductance and the rotor inductance respectively, wherein $L_m^2 = L_s L_r (1-\sigma)$, $\sigma$ is the total leakage inductance coefficient, $i_{sd}$ is d-axis component of the stator current, $i_{sq}$ is q-axis component of the stator current, $i_{rd}$ is d-axis component of the rotor current, $i_{rq}$ is q-axis component of the rotor current, $u_{sd}$ is d-axis component of the stator voltage, $u_{sq}$ is q-axis component of the stator voltage, $\omega_e$ and $\omega_s$ are the stator frequency and slip frequency respectively, $R_s$ and $R_r$ are the stator resistance and the rotor resistance respectively.

Correspondingly, the output torque $T_e$ of the induction motor is represented by the equation (3) as follows:

$$T_e = n_p(i_{sq}\psi_{sd} - i_{sd}\psi_{sq}) \quad (3)$$

where $n_p$ is the number of the pole-pairs.

The applicant has found in the study that when the induction motor is running at high speed in flux-weakening region, the stator resistance can be neglected since the stator frequency (i.e. the output frequency of transducer) is particularly high. Such conclusions have been drawn as follows: the voltage direction of the stator is consistent with the electromotive direction of the stator, and the steady-state and transient values of the d-axis component of the stator flux linkage are zero at the same time. Therefore, the stator flux linkage $\psi_{sdq}$ meets $\psi_{sd}=0$, and $\psi_{sq}=-u_{sd}/\omega_e$ can be obtained according to the equation (2), $T_e=n_p i_{sd} u_{sd}/\omega_e$ can be obtained according to the equation (3). It can be seen that the torque is proportional to the torque current. In order to make the induction motor output the maximum torque during the acceleration process in the flux-weakening region, $i_{sd}$ must have the maximum value. Hereinafter, the applicant will derive the function relationship between the torque current $i_{sd}$ and excitation current based on the electromotive force directional processing of the stator (i.e. the voltage direction of the stator is consistent with the electromotive direction of the stator).

By substituting the stator flux linkage $\psi_{sdq}$ (satisfying $\psi_{sd}=0$, $\psi_{sq}=-u_{sd}/\omega_e$) into equation (1), it can be concluded that the rotor flux linkage must satisfy the following equation (4):

$$\begin{cases} \psi_{rd} = -\sigma L_r L_s i_{sd} / L_m \\ \psi_{rq} = -\sigma L_r L_s i_{sq} / L_m - L_r u_{sd} / L_m \omega_e \end{cases} \quad (4)$$

It is known that $T_r = L_r/R_r$, where $T_r$ is the rotor time constant. By substituting the stator flux linkage $\psi_{sdq}$ (satisfying $\psi_{sd}=0$, $\psi_{sq}=-u_{sd}/\omega_e$) into the equation (2), it can be concluded that the rotor flux linkage $\psi_{rdq}$ must satisfy the following equation (5):

$$\begin{cases} T_r p\psi_{rd} = -\psi_{rd} + \omega_s T_r \psi_{rq} + L_m i_{sd} \\ T_r p\psi_{rq} = -\psi_{rq} - \omega_s T_r \psi_{rd} + L_m i_{sq} \end{cases} \quad (5)$$

It is known that $\omega_{sm}=R_r/\sigma L_s$ in case of ignoring the stator resistance, where $R_r$ is the rotor resistance, and $\omega_{sm}$ is the maximum slip frequency that can be operational. Due to $L_r \approx L_s \approx L_m$, substituting the equation (4) into the equation (5), the following equations (6a) and (6b) can be obtained:

$$\begin{cases} \dfrac{\omega_s}{\omega_{sm}} = -\dfrac{i_{sq}}{i_{sd}} - \dfrac{u_{sd}}{i_{sd}\omega_e L_r} + \dfrac{p\psi_{rq}}{R_r i_{sd}} & \text{(6a)} \\ \dfrac{\omega_s}{\omega_{sm}} = \left(i_{sd} + \dfrac{pi_{sd}}{\omega_{sm}}\right) \bigg/ \left(i_{sq} + \dfrac{u_{sd}}{\sigma L_s \omega_e}\right) & \text{(6b)} \end{cases}$$

It is known that the no-load magnetizing current $I_m = I_{mN} \cdot u_{sN(p.u.)}/\omega_{e(p.u.)}$, where $\omega_{e(p.u.)}$ is a per unit value of synchronous frequency. When the voltage direction of the stator is consistent with the electromotive direction of the stator, $u_{sd(p.u.)} = u_{sN(p.u.)}$, then $I_m I_{mN} \cdot u_{sd(p.u.)}/\omega_{e(p.u.)}$. In the flux-weakening region, $u_{sd(p.u.)} = 1$, so the no-load magnetizing current $I_m$ can be represented by equation (7) as follows:

$$I_m = I_{mN}/\omega_{e(p.u.)} \tag{7}$$

It is known that $I_{mN} = u_{sN}/(L_r \cdot \omega_{eN})$, where $u_{sN}$ is rated stator voltage, $\omega_{eN}$ is rated synchronous frequency, $L_r$ is rotor inductance, $I_{mN}$ represents rated no-load excitation current, so $I_m = u_{sd}/(L_r \cdot \omega_e)$. Herein $i_m$ represents the excitation current $-i_{sq}$, $i_t$ represents the torque current $i_{sd}$. Since $L_r \approx L_s$, by ignoring the differential terms in the equations (6a) and (6b), steady-state equations can be represented by equations (8a) and (8b) as follows:

$$\begin{cases} \dfrac{\omega_s}{\omega_{sm}} = i_m/i_t - I_m/i_i & \text{(8a)} \\ \dfrac{\omega_s}{\omega_{sm}} = i_t/(I_m/\sigma - i_m) & \text{(8b)} \end{cases}$$

According to equations (8a) and (8b), the relationship between the excitation current $i_m$ and the torque current $i_t$ can be represented by equation (9) as follows:

$$i_t = \sqrt{-i_m^2 + i_m I_m\left(\dfrac{1}{\sigma}+1\right) - I_m^2 \dfrac{1}{\sigma}} \tag{9}$$

Since $T_e = n_p i_{sd} u_{sd}/\omega_e = n_p i_t u_{sd}/\omega_e$, the output torque $T_e$ is proportional to the torque current $i_t$ in condition that the stator frequency is constant. From the equation (9), the applicant found that it is possible to obtain the maximum torque current $i_t$ and the maximum torque $T_e$ of the induction motor by controlling the excitation current $i_m$. Furthermore, from the equation (9), the applicant found that the torque current $i_t$ has a maximum value when the excitation current $i_m$ satisfies the following equation (10).

$$i_m = 0.5 \cdot I_m(1/\sigma+1) \tag{10}$$

In order to make the induction motor have a stable operating point and avoid system collapse, the excitation current $i_m$ also needs to meet $I_m \leq i_m \leq I_m/\sigma$. In any case, the no-load excitation current $I_m \leq$ the excitation current $i_m$, so the excitation current $i_m$ satisfies the following equation (11):

$$i_m \leq I_m/\sigma = I_{mN}/[\sigma \cdot \omega_{e(p.u.)}] \tag{11}$$

In addition, in order to avoid overcurrent which may cause burn-out of the motor, the excitation current $i_m$ and the torque current $i_t$ must satisfy the following equation (12) representing maximum current limiting condition.

$$i_m^2 + i_t^2 \leq I_{s,max}^2 \tag{12}$$

Where $I_{s,max}$ is per unit value of maximum current of the stator, $i_m$ and $i_t$ are per unit values.

In order to clearly show the relationship between the excitation current and the torque current, a Cartesian coordinate system is built, wherein the excitation current $i_m$ is the horizontal ordinate and the torque current $i_t$ is the vertical ordinate. FIG. 1 shows the functional images of the equations (9) and (12) in the Cartesian coordinate system, wherein semicircles 11, 12 and 13 are functional images of the equation (9) when the stator frequencies are $\omega_{eN}$, $\omega_{e2}$ and $\omega_{e3}$ respectively, where $\omega_{eN} < \omega_{e2} < \omega_{e3}$. According to the equation (9), the maximum torque current $i_m$ reduces gradually as the stator frequency $\omega_e$ increases gradually without considering current limiting. The straight line segment AD is the set of the maximum values of the torque current $i_t$ in the equation (9) at different stator frequencies. After considering the current limiting condition represented by the equation (12) (the functional image of equation (12) is a quarter circle 15), when the stator frequency is the rated synchronous frequency $\omega_{eN}$, it can be seen that the point B in FIG. 1 corresponds to the maximum torque current. In the process of per unit values, $I_{s,max}=1$, the excitation current corresponding to point B obtained by equations (9) and (12) is represented by the equation (13) as follows:

$$i_{m,optB} = (I_m^2 + \sigma)/(I_m + \sigma I_m) \tag{13}$$

At a certain stator frequency, when the excitation current calculated by the equation (10) is greater than the excitation current calculated by the equation (13), the excitation current calculated by the equation (13) is substituted into the equation (9) so as to obtain the maximum allowable torque current (i.e. the maximum output torque). The arc segment BC in FIG. 1 (point C is on the straight line segment AD) is the set of the maximum torque current when the excitation current calculated by the equation (10) is greater than the excitation current calculated by the equation (13). Similarly, the straight line CD is the set of the maximum torque current when the excitation current calculated by the equation (10) is less than the excitation current calculated by the equation (13). It can be seen from FIG. 1 that the excitation current corresponding to the curve BCD is less than half of the maximum allowable excitation current under the system stability condition. When the estimated total leakage inductance is only half of the actual total leakage inductance, the excitation currents calculated by the equations (10) and (13) are also less than the maximum allowable excitation current. Therefore, the motor can be operated stably, and the leakage inductance parameter errors have lower sensitivity.

Based on the above results, the applicant adjusts the acceleration value of the stator frequency by using the excitation current. The closed loop negative feedback control is used to calculate the excitation current set point corresponding to the maximum torque current according to the stator frequency, the difference between the excitation current set point and the actual excitation current of the induction motor is provided as the controlling variable, and the stator frequency acceleration value is provided as the controlled variable. The rising rate of the stator frequency is controlled so that the induction motor has the maximum output torque in the process of controlling the stator frequency accelerating.

Figure 2:
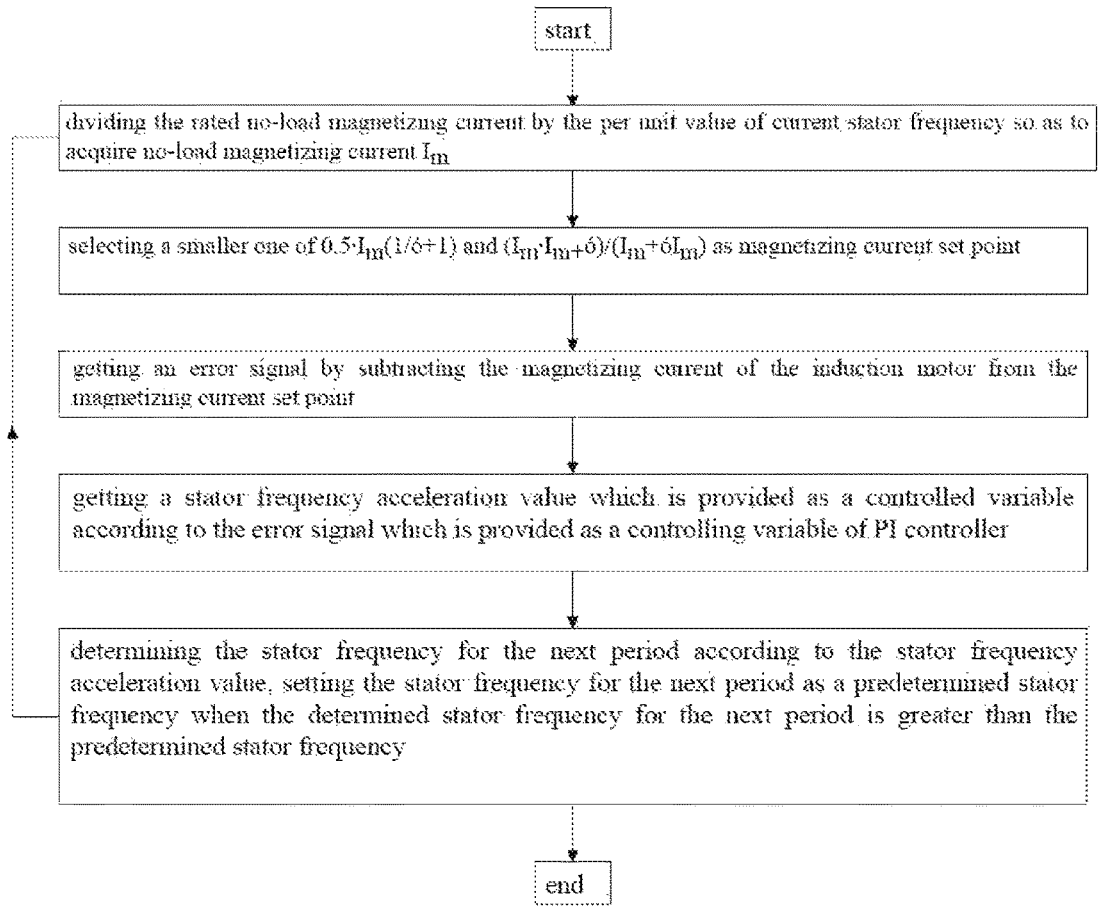
FIG. 2 is a flow chart of an acceleration method for V/f controlled induction motor in flux-weakening region of a preferred embodiment of the present invention.

FIG. 2 is a flow chart of an acceleration method for V/f controlled induction motor in flux-weakening region of a preferred embodiment of the present invention. Dividing the rated no-load magnetizing current $I_{mN}$ by the per unit value of current stator frequency $\omega_e(n)$ so as to acquire no-load magnetizing current $I_m$; selecting a smaller one of $0.5 \cdot I_m(1/\sigma+1)$ and $(I_m^2+\sigma)/(I_m+\sigma I_m)$ as magnetizing current set point $i_{mset}$, in which $\sigma$ is an estimated total leakage inductance coefficient; getting an error signal $e_i$ by subtracting the magnetizing current $i_m$ of the induction motor from the magnetizing current set point $i_{mset}$; providing the error signal $e_i$ as a controlling variable of proportional integral (PI) controller and stator frequency acceleration value $A_{cc}$ as a controlled variable of the PI controller; and the PI controller obtains stator frequency acceleration value $A_{cc}$ according to the error signal $e_i$. A person skilled in the art can design and adjust a reasonable proportional adjustment coefficient $K_p$ and an integral adjustment coefficient $K_i$ according to the controlling variable and the controlled variable of the PI controller. Therefore, the stator frequency acceleration value $A_{cc}=e_i(K_p+K_i/s)$, where s represents the frequency domain. The stator frequency for the next control period is calculated according to the stator frequency acceleration value $A_{cc}$ and $\omega_e(n+1)=\omega_e(n)+A_{cc} \cdot T_s$, where $T_s$ is pulse width modulation period. If $\omega_e(n+1)$ is not greater than the predetermined stator frequency $\omega_{ref}$, the stator frequency for the next control period is set to be $\omega_e(n+1)$. If $\omega_e(n+1)$ is greater than the predetermined stator frequency $\omega_{ref}$, the stator frequency for the next control period is set to be $\omega_{ref}$. In the next control cycle, the above acceleration method is repeated so that the stator frequency gradually increases to the predetermined stator frequency $\omega_{ref}$. A person skilled in the art can estimate the total leakage inductance $\sigma$ according to the existing induction motor off-line parameter identification method, for example, by applying high frequency square wave excitation to estimate the stator and rotor leakage inductances and further calculating the total leakage inductance a. The specific steps are not described here in detail.

Figure 3:
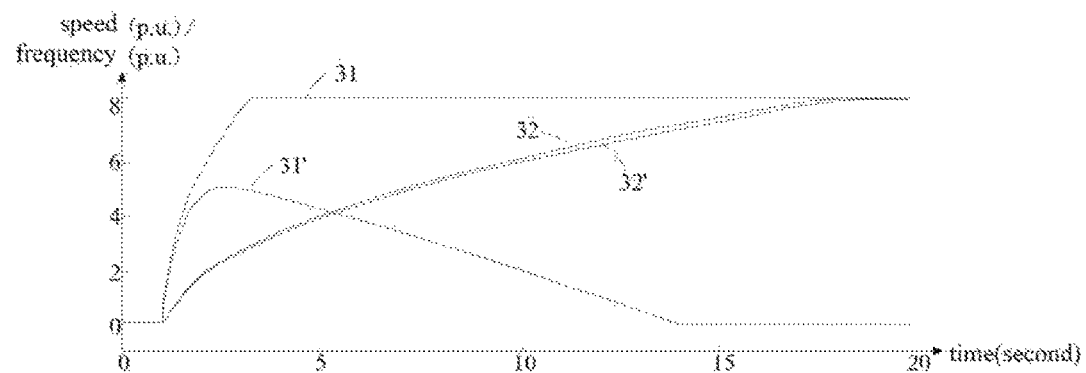
FIG. 3 is stator frequency-time graphs and corresponding motor speed-time graphs by using the existing acceleration method.

A simulation platform is developed to verify the acceleration method of the present invention. The system parameters are as follows: the number of the pole pairs=2, input voltage=380v, input frequency=50 Hz, output power=3 hp (2.2 kw), inverter switching frequency=10 kHz, the torque load is 5% of the rated load. By using the per unit value processing, the stator frequency increases from 0.04 p.u. to 8 p.u. (400 Hz) at different acceleration processes. FIG. 3 is stator frequency-time graphs and corresponding motor speed-time graphs by using the existing acceleration method. The curves 31 and 31' are stator frequency-time curve and corresponding motor speed-time curve respectively. It can be seen from the curves 31, 31' in the FIG. 3 that when the stator frequency increases from 0.04 p.u. to 8 p.u. at a faster acceleration, the motor cannot provide enough torque so that the rotor speed increases rapidly and the motor stops finally. Therefore, the greater acceleration of the stator frequency causes the system to be unstable and collapse. The curves 32, 32' are the stator frequency-time curve and the corresponding motor speed-time curve respectively. When the stator frequency increases from 0.04 p.u. to 8 p.u. at a smaller acceleration, the rotor speed increases gradually as the stator frequency increases, but the entire acceleration process is longer (continued for about 18 seconds).

Figure 4:
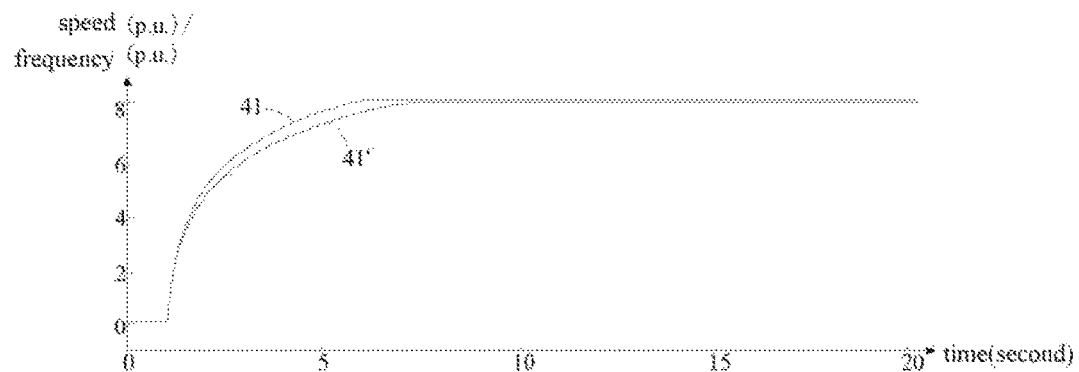
FIG. 4 is a stator frequency-time graph and corresponding motor speed-time graph by using acceleration method of the present invention.

FIG. 4 is a stator frequency-time graph and corresponding motor speed-time graph by using acceleration method of the present invention. The curves 41, 41' are the stator frequency-time curve and corresponding motor speed-time curve respectively. When the stator frequency rapidly increases from 0.04 p.u. to 8 p.u., the rotor speed also rapidly (6 seconds) increases from 0.04 p.u. to 8 p.u. Therefore, the acceleration method of the present invention not only ensures the stable operation of the system, but also provides a faster acceleration process.

Figure 5:
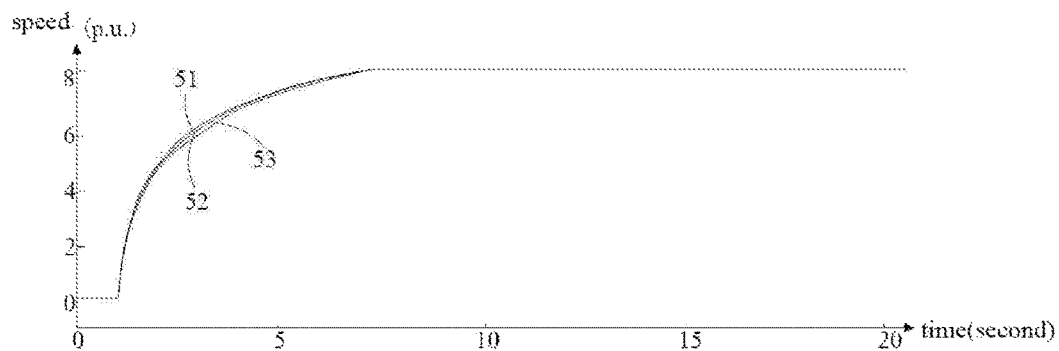
FIG. 5 shows the motor speed-time graphs by using the acceleration method of the present invention under different total leakage inductance coefficient estimation errors.

FIG. 5 shows the motor speed-time graphs by using the acceleration method of the present invention under different total leakage inductance coefficient estimation errors. The curves 51, 52 and 53 in FIG. 5 are the motor speed-time curves corresponding to the total leakage inductance coefficient errors being +20%, −20% and −50% respectively. It can be seen from FIG. 5 that three motor speed-time curves are basically coincident. When the deviations of the estimated total leakage inductance coefficients relative to the true total leakage inductance coefficient of the induction motor are ±20% and −50%, the induction motor operates stably and has substantially the same output torque. Thus, even if the estimated total leakage inductance coefficient is only half the true total leakage inductance coefficient, the motor systems can also operate stably.

Figure 6:
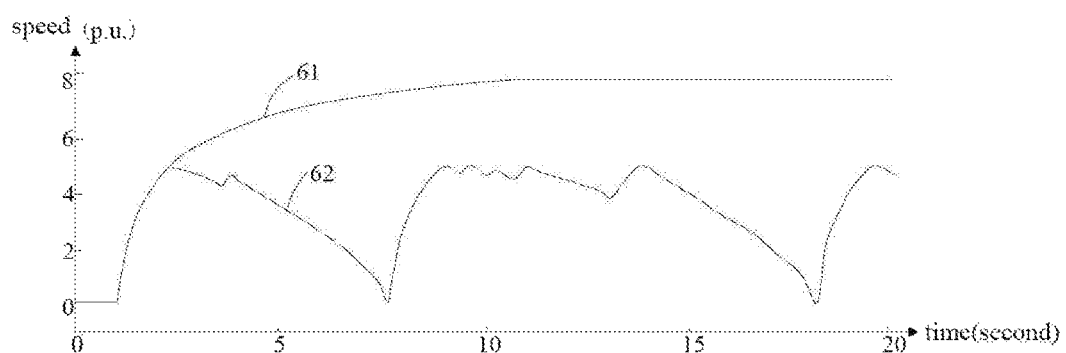
FIG. 6 shows the motor speed-time graphs by using the existing vector control acceleration method under different total leakage inductance coefficient estimation errors.

FIG. 6 shows the motor speed-time graphs by using the existing vector control acceleration method under different total leakage inductance coefficient estimation errors. The curves 61, 62 are the motor speed-time curves corresponding to the total leakage inductance coefficient errors being +20% and −20% respectively. When the estimated total leakage inductance coefficients is 80% of the total leakage inductance coefficient of the induction motor (i.e. the deviation is −20%), the motor system cannot operate stably. Compared with the existing vector control method, the acceleration method of the present invention has a larger allowable error range of the estimated leakage inductance parameter and a larger tolerance for the error of leakage inductance.

In another embodiment of the present invention, both the proportional adjustment coefficient $K_p$ and integral adjustment coefficient $K_i$ of the PI controller are divided by the per unit value of the stator frequency $\omega_e(n)$, so, the controlled variable $A_{cc}=e_i(K_p+K_i/s)\omega_e(n)$. Therefore, the larger the stator frequency is, the smaller the parameter of the PI controller is, which is in favor of the stator frequency increasing gradually.

In another embodiment of the present invention, the PI controller of the above embodiment can be replaced by other negative feedback controllers such as PID controller. The control parameters of the negative feedback controllers are not limited herein.

In other embodiments of the present invention, the no-load magnetizing currents at different stator frequencies are measured directly when the induction motor is in no-load condition.

The present invention further provides a V/f controlling method comprising the above-mentioned acceleration method.

Figure 7:
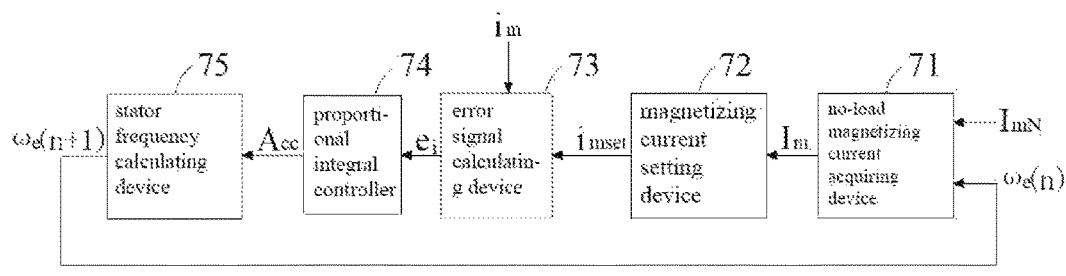
FIG. 7 is a block diagram of an acceleration system for V/f controlled induction motor in flux-weakening region according to a preferred embodiment of the present invention.

According to an embodiment of the present invention, an acceleration system for V/f controlled induction motor in flux-weakening region is also provided. As shown in FIG. 7, an acceleration system 70 comprises a no-load magnetizing current acquiring device 71, a magnetizing current setting device 72, an error signal calculating device 73, a proportional integral (PI) controller 74, and a stator frequency calculating device 75.

The no-load magnetizing current acquiring device 71 acquires no-load magnetizing current $I_m$ by dividing the rated no-load magnetizing current $I_{mN}$ by the per unit value of current stator frequency $\omega_e(n)$. The magnetizing current setting device 72 selects a smaller one of $0.5 \cdot I_m(1/\sigma+1)$ and $(I_m^2+\sigma)/(I_m+\sigma I_m)$ as magnetizing current set point $i_{mset}$, in which a is an estimated total leakage inductance coefficient. The magnetizing current setting device 72 can estimate total leakage inductance coefficient σ according to an off-line parameter identification method of the induction motor. The error signal calculating device 73 is configured to get an error signal $e_i$ by subtracting the magnetizing current $i_m$ of the induction motor from the magnetizing current set point $i_{mset}$. The PI controller 74 is configured to get a stator frequency acceleration value $A_{cc}$ which is provided as a controlled variable according to the error signal $e_i$ which is provided as a controlling variable. A person skilled in the art can design and adjust a reasonable proportional adjustment coefficient $K_p$ and an integral adjustment coefficient $K_i$ according to the controlling variable and the controlled variable of the PI controller 74. Therefore, the stator frequency acceleration value $A_{cc}=e_i(K_p+K_i/s)$, where s represents the frequency domain. The stator frequency calculating device 75 is configured to calculate the stator frequency for the next control period according to the stator frequency acceleration value $A_{cc}$ and $\omega_e(n+1)=\omega_e(n)+A_{cc} \cdot T_s$, where $T_s$ is pulse width modulation period. In another embodiment of the present invention, the acceleration system 70 further comprises a stator frequency limiting device, which is configured to set the stator frequency for the next control period to be $\omega_e(n+1)$ if $\omega_e(n+1)$ is not greater than the predetermined stator frequency $\omega_{ref}$, and set the stator frequency for the next control period to be $\omega_{ref}$ if $\omega_e(n+1)$ is greater than the predetermined stator frequency $\omega_{ref}$.

In another embodiment of the present invention, the controlled variable of the PI controller is equal to the error signal $e_1$ multiplied by $(K_p+K_i/s)/\omega_e(n)$, where $K_p$ is a proportional adjustment coefficient, $K_1$ is an integral adjustment coefficient, and s represents a frequency domain, $\omega_e(n)$ is a per unit value of the current stator frequency.

An embodiment of the present invention further provides a V/f controlling system which comprises the above-mentioned acceleration system.

Although the present invention has been described with preferred embodiments, but the present invention is not limited to the embodiments described herein, and comprises various modifications and alterations, without departing from the scope of the invention.

The invention claimed is:

1. An acceleration method for a V/f controlled induction motor in a flux-weakening region comprising:
    acquiring a no-load magnetizing current $I_m$ of the V/f controlled induction motor at a current stator frequency;
    selecting a smaller one of $0.5 \cdot I_m(1/\sigma+1)$ and $(I_m^2+\sigma)/(I_m+\sigma I_m)$ as a magnetizing current set point, in which σ is an estimated total leakage inductance coefficient;
    acquiring an error signal by subtracting a magnetizing current of the V/f controlled induction motor from the magnetizing current set point, wherein the error signal is provided as a controlling variable of negative feedback; and
    determining a stator frequency for a next control period according to the error signal.

2. The acceleration method of claim 1 further comprising:
    determining an acceleration value of the stator frequency as a controlled variable according to the error signal; and
    determining a stator frequency for the next control period according to the acceleration value of the stator frequency.

3. The acceleration method of claim 2 further comprising setting the stator frequency for the next control period as a predetermined stator frequency when the determined stator frequency for the next control period is greater than a predetermined stator frequency.

4. The acceleration method of claim 2 further comprising:
    acquiring the acceleration value of the stator frequency with a proportional integral controller; and
    determining the acceleration value of the stator frequency to be equal to the error signal multiplied by $K_p+K_i/s$, where $K_p$ is a proportional adjustment coefficient, $K_i$ is an integral adjustment coefficient, and s represents the frequency domain.

5. The acceleration method of claim 2 further comprising:
    acquiring the acceleration value of the stator frequency with a proportional integral controller; and
    determining the acceleration value of the stator frequency to be equal to the error signal multiplied by $(K_p+K_i/s)/\omega_e(n)$, where $K_p$ is a proportional adjustment coefficient, $K_i$ is an integral adjustment coefficient, s represents a frequency domain, and $\omega_e(n)$ is a per unit value of the current stator frequency.

6. The acceleration method of claim 1 further comprising acquiring the no-load magnetizing current by dividing a rated no-load magnetizing current of the V/f controlled induction motor by a per unit value of the current stator frequency.

7. The acceleration method of claim 1 further comprising estimating the estimated total leakage inductance coefficient according to an off-line parameter identification method of the V/f controlled induction motor.

8. An acceleration system for a V/f controlled induction motor in a flux-weakening region comprising:
    a no-load magnetizing current acquiring device for acquiring a no-load magnetizing current $I_m$ of the V/f controlled induction motor at a current stator frequency;
    a magnetizing current setting device for selecting a smaller one of $0.5 \cdot I_m(1/\sigma+1)$ and $(I_m^2+\sigma)/(I_m+\sigma I_m)$ as a magnetizing current set point, in which σ is an estimated total leakage inductance coefficient;
    an error signal calculating device for acquiring an error signal by subtracting a magnetizing current of the V/f controlled induction motor from the magnetizing current set point, wherein the error signal is provided as a controlling variable of negative feedback; and
    a stator frequency determining device for determining a stator frequency for a next control period according to the error signal.

9. The acceleration system of claim 8 wherein the stator frequency determining device comprises:
    a negative feedback controller for acquiring an acceleration value of the stator frequency as a controlled variable according to the error signal; and
    a stator frequency calculating device for determining the stator frequency for the next control period according to the acceleration value of the stator frequency.

10. The acceleration system of claim 9 wherein the stator frequency determining device further comprises a stator frequency limiting device for setting the stator frequency for the next control period as a predetermined stator frequency when the determined stator frequency for the next control period is greater than a predetermined stator frequency.

11. The acceleration system of claim 9 wherein the negative feedback controller is a proportional integral controller; and
    wherein the stator frequency acceleration value is equal to the error signal multiplied by $K_p+K_i/s$, where $K_p$ is a proportional adjustment coefficient, $K_i$ is an integral adjustment coefficient, and s represents the frequency domain.

12. The acceleration system of claim 9 wherein the negative feedback controller is a proportional integral controller; and wherein the stator frequency acceleration value is equal to the error signal multiplied by $(K_p+K_i/s)/\omega_e(n)$, where $K_p$ is a proportional adjustment coefficient, $K_i$ is an integral adjustment coefficient, s represents a frequency domain, and $\omega_e(n)$ is a per unit value of the current stator frequency.

13. The acceleration system of claim 8 wherein the no-load magnetizing current acquiring device is configured to acquire the no-load magnetizing current by dividing a rated no-load magnetizing current of the V/f controlled induction motor by the per unit value of the current stator frequency.

14. The acceleration system of claim 8 wherein the magnetizing current setting device is further configured to estimate the estimated total leakage inductance coefficient according to an off-line parameter identification method of the V/f controlled induction motor.

15. A V/f controlling system comprising the acceleration system for a V/f controlled induction motor of claim 8.

* * * * *